(12) United States Patent
Madaiah

(10) Patent No.: US 9,894,557 B2
(45) Date of Patent: Feb. 13, 2018

(54) SYSTEM AND METHOD FOR PREVENTING RETRANSMISSION OF DROPPED DATA PACKETS FROM A MOBILE STATION

(71) Applicant: TEJAS NETWORKS LIMITED, Bangalore (IN)

(72) Inventor: Vinod Kumar Madaiah, Bangalore (IN)

(73) Assignee: TEJAS NETWORKS LIMITED, Karnataka (IN)

( * ) Notice: Subject to any disclaimer, the term of this patent is extended or adjusted under 35 U.S.C. 154(b) by 79 days.

(21) Appl. No.: 15/073,669

(22) Filed: Mar. 18, 2016

(65) Prior Publication Data

US 2016/0277960 A1    Sep. 22, 2016

(51) Int. Cl.

| | |
|---|---|
| *H04W 28/02* | (2009.01) |
| *H04L 29/06* | (2006.01) |
| *H04B 7/06* | (2006.01) |
| *H04L 29/08* | (2006.01) |
| *H04L 1/18* | (2006.01) |
| *H04W 88/08* | (2009.01) |
| *H04W 80/06* | (2009.01) |
| *H04W 28/14* | (2009.01) |
| *H04L 1/00* | (2006.01) |

(52) U.S. Cl.
CPC ...... *H04W 28/0273* (2013.01); *H04B 7/0623* (2013.01); *H04L 1/18* (2013.01); *H04L 1/1867* (2013.01); *H04L 67/288* (2013.01); *H04L 69/161* (2013.01); *H04L 2001/0097* (2013.01); *H04W 28/14* (2013.01); *H04W 80/06* (2013.01); *H04W 88/08* (2013.01)

(58) Field of Classification Search
CPC . H04W 28/0273; H04W 28/14; H04W 80/06; H04W 88/08; H04L 69/161; H04L 67/288; H04L 1/1867; H04L 1/18; H04L 2001/0097; H04B 7/0623
See application file for complete search history.

(56) References Cited

U.S. PATENT DOCUMENTS

2013/0159806 A1* 6/2013 Okuno ............. H04L 1/18
714/749
2014/0153574 A1* 6/2014 Louzoun ............. H04L 1/188
370/392

* cited by examiner

*Primary Examiner* — Joshua Kading
(74) *Attorney, Agent, or Firm* — Barry Choobin; Patent 360 LLC

(57) ABSTRACT

A system for circumventing retransmission of dropped data packets from a source mobile station is envisaged. The source mobile station is coupled to a destination mobile station. The source mobile station and destination mobile station are coupled to a source eNodeB and a destination eNodeB respectively. The source eNodeB and the destination eNodeB are configured to interpret any No Acknowledgement (NACK) messages transmitted from the destination mobile station on account of non receipt of data packets transmitted from the source mobile station, and accordingly retransmit, from a buffered data packet pool, the data packets corresponding to the NACK messages. The source eNodeB and destination eNodeB prevent NACK messages from being retransmitted to the source mobile station thereby obviating the need for the source mobile station to retransmit dropped data packets, and rendering the source mobile station available for any subsequent data transfer operations.

7 Claims, 3 Drawing Sheets

SYSTEM AND METHOD FOR PREVENTING RETRANSMISSION OF DROPPED DATA PACKETS FROM A MOBILE STATION

CROSS REFERENCE TO RELATED APPLICATIONS

Benefit is claimed under 35 U.S.C. 119(a)-(d) to Foreign application Serial No. 1327/CHE/2015 filed in India entitled "A SYSTEM AND METHOD FOR PREVENTING RETRANSMISSION OF LOST DATA PACKETS IN TCP SESSION IN WIRED/WIRELESS COMMUNICATION CHANNEL", on Mar. 18, 2105, by TEJAS NETWORKS LIMITED, which is herein incorporated in its entirety by reference for all purposes.

TECHNICAL FIELD

The present disclosure relates to telecommunication systems. Particularly, the present disclosure is related to telecommunication networks. More particularly, the present disclosure is related to distributing Transmission control protocol (TCP) across a telecommunication network.

BACKGROUND

In comparison to wired telecommunication networks, wireless communication networks are likely to be affected by transmission errors since wireless communication networks are comparatively sensitive to multipath fading and Doppler shift (which occurs due to a difference in the relative velocity between a transmitter and a receiver) among other factors. Several factors are considered for determining the transmission efficiency of a communication channel, be it a wired communication channel or a wireless communication channel. Most common amongst those factors are Signal to Noise Ratio (SNR) and bit rate (bit rate specifies the number of bits which are erroneously transmitted out of a particular number of transmitted bits). It is a well established fact that the values of SNR and bit rate are far greater for a wireless communication channel than that of a wired communication channel.

Figure 1:
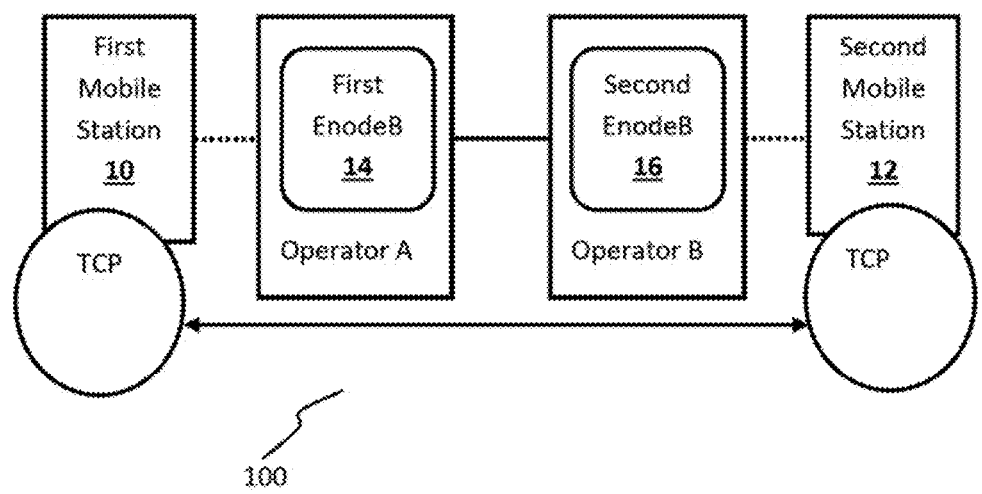

Referring to FIG. 1, there is shown a conventional communication network 100 comprising two mobile stations (MS), a first mobile station 10 and a second mobile station 12. Two network elements, preferably eNodeBs, namely a first eNodeB 14 and a second eNodeB 16 interface with respective mobile stations via corresponding wireless communication channels. Simultaneously, the two eNodeBs 14 and 16 interface with other network elements (including but not restricted to routers, switches) via corresponding wired communication channels. A typical data transfer operation from the first mobile station 10 to the second mobile station 12 requires the data packets to be transmitted from the first mobile station 10 to the first eNodeB 14 via a wireless communication channel. Subsequently, the first eNodeB 14 transmits the data packets over a wired communication channel to the second eNodeB 16 which in turn transmits the data packets to the second mobile station 12 via a wireless communication channel.

When data is transmitted over the communication network from the first mobile station 10 to the second mobile station 12, due to congestion therein (congestion is typically prevalent at fixed network elements such as routers and switches), some of the data packets (transmitting the data) are typically dropped. Given the fact that the data packets are transmitted in adherence to the Transmission Control Protocol (TCP) which is an end-to-end congestion protocol, the TCP entity of the first mobile station 10 would have retransmit any dropped data packets. However, since the first mobile station 10 communicates with the first eNodeB 14 via a wireless communication channel, there could be substantial delay in retransmission of the dropped packets, due to the fact that wireless communication channels are time varying channels. Further, in an exemplary scenario, if a data packet under transmission is lost in the wired network connecting the first eNodeB 14 to the second eNodeB 16, the second mobile station 12 sends a NACK (negative acknowledgement) message to the first mobile station 10 indicating non-receipt of the transmitted data packet. In such a case, the first mobile station 10 would have to retransmit the dropped lost data packet using the wireless communication channel that connects the first mobile station 10 and the first eNodeB 14. Since the data packet has been lost/dropped due to congestion in the wired network connecting the first eNodeB 14 to the second eNodeB 16, retransmitting the dropped data packet using the wireless channel connecting the first mobile station 10 and the first eNodeB 14 would result in unnecessary utilization of wireless communication channel thereby adversely affecting the availability of wireless communication channel for subsequent data transmission operations. Since wireless resources are scarce, there has been felt a need to better manage the available wireless resources (including wireless communication channels) by bring about a reduction in repetitive usage of wireless communication channels for the purpose of retransmitting dropped data packets.

OBJECTS

An object of the present disclosure is to provide a system and method that enables distributed TCP sessions.

Another object of the present disclosure is to provide a system and method that prevents needless utilization of wireless communication channels.

Still a further object of the present disclosure is to provide a system and method that prevents retransmission of lost/dropped data packets through a wireless communication channel.

One more object of the present disclosure is to make available a system and method that provides for improved utilization of wireless communication channels.

Yet another object of the present disclosure is to make available a system and method that provides for efficient management of wireless communication resources.

SUMMARY

The present disclosure envisages a method for preventing retransmission of data packets via Transmission Control Protocol (TCP) sessions of mobile stations. The method envisages the following steps: distributing a first end point of a TCP session between a source mobile station and a source network element; distributing a second end point of the TCP session between a destination mobile station and a destination network element; initiating transmission of a plurality of data packets from the source mobile station to the destination mobile station via the source network element and destination network element; configuring the source network element to intercept Negative Acknowledgement messages (NACK) transmitted front the destination mobile station and intended for the source mobile station, and further configuring the source network element to identify and retransmit data packets corresponding to the NACK messages, to the destination mobile station; and configuring the destination network element to selectively intercept the Negative Acknowledgement (NACK) messages transmitted from the destination mobile station and intended for the source mobile station, and further configuring the destination network element to retransmit data packets corresponding to the NACK messages, to the destination mobile station only in the event that the data packets have been received and buffered by the destination network element.

In accordance with the present disclosure, the step of configuring the source network element to identify and retransmit data packets to the destination mobile station, further includes the step of preventing the source mobile station from retransmitting the data packets in response to the NACK messages transmitted from the destination mobile station.

The present disclosure envisages a system for preventing retransmission of data packets via Transmission Control Protocol (TCP) session of mobile stations. The system comprises a source mobile station, a source network element, a destination mobile station and a destination network element.

In accordance with the present disclosure, the source network element is configured to intercept Negative Acknowledgement messages (NACK) transmitted from the destination mobile station and intended for the source mobile station, the source network element further configured to identify and retransmit data packets corresponding to the NACK messages, to the destination mobile station.

In accordance with the present disclosure, the destination network element is configured to selectively intercept the Negative Acknowledgement (NACK) messages transmitted from the destination mobile station and intended for the source mobile station, the destination network element further configured to retransmit data packets corresponding to the NACK messages, to the destination mobile station only in the event that the data packets have been received and buffered by the destination network element.

In accordance with the present disclosure, the source network element and destination network element are configured to prevent the source mobile station and destination mobile station from retransmitting data packets corresponding to the NACK messages, thereby preventing utilization of Transmission Control Protocol (TCP) sessions corresponding to the source mobile station and destination mobile station, for retransmission of the data packets.

In accordance with the present disclosure, the source mobile station and source network element are communicably coupled through a first wireless communication channel, and wherein the destination mobile station and destination network element are communicably coupled through a second wireless communication channel, and wherein the source network element and destination network element are communicably coupled through a wired communication channel.

In accordance with the present disclosure, the system is further configured to prevent retransmission of data packets in response to the NACK messages on the first wireless communication channel and second wireless communication channel, said system further configured to provide for retransmission of data packets in response to the NACK messages, over the wired communication channel communicably coupling said source network element and destination network element.

BRIEF DESCRIPTION OF THE ACCOMPANYING DRAWINGS

Figure 2:
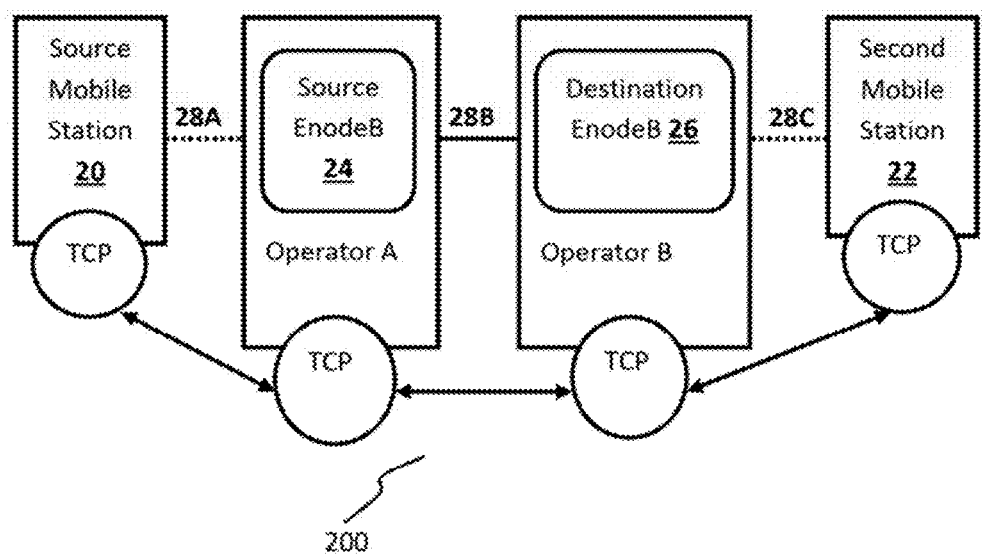
Figure 3:
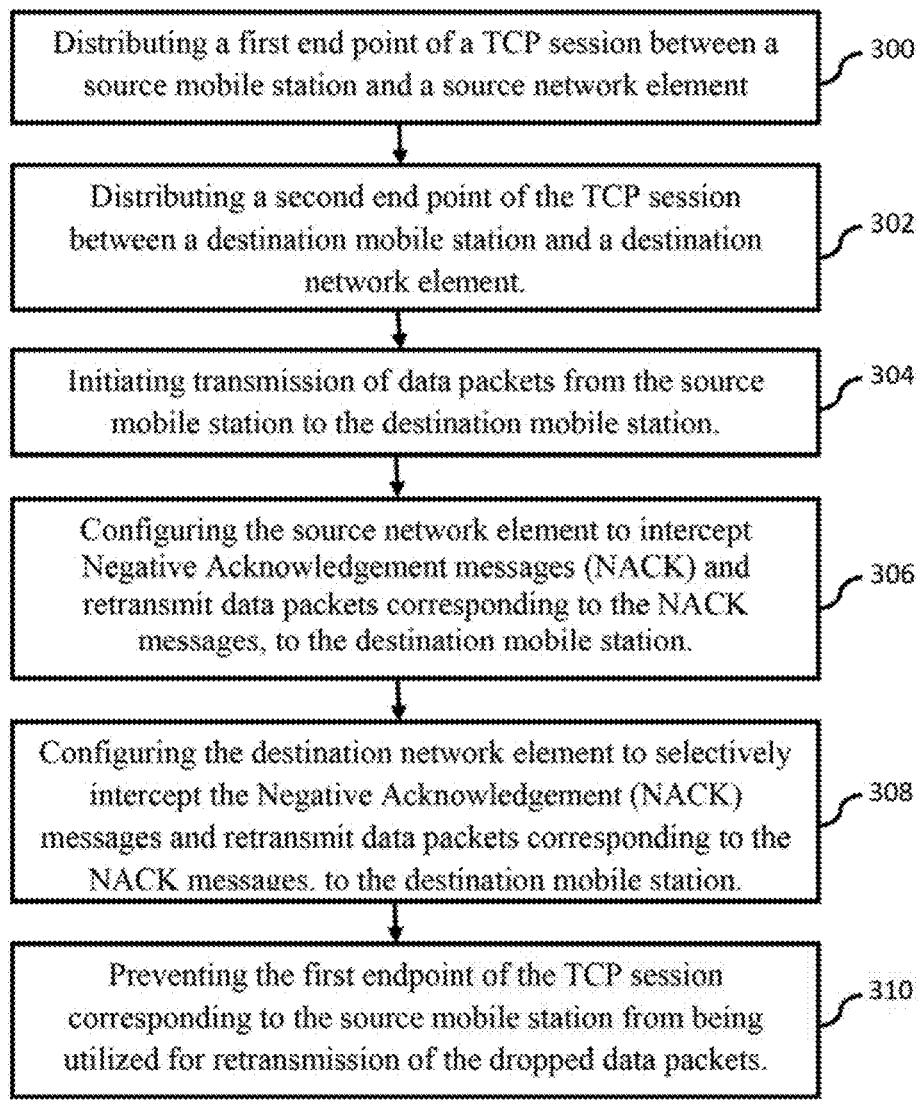

The other objects, features and advantages envisaged by the present disclosure will be apparent to those skilled in the art from the following description and the accompanying drawings in which:

FIG. 1 is a prior art diagram illustrating a conventional telecommunication network;

FIG. 2 is a diagram describing a telecommunication network implementing Distributed Transmission Control Protocol (DTCP) for preventing retransmission of dropped data packets from a mobile station, in accordance with the present disclosure; and FIG. 3 is a flow chart illustrating the steps involved in the method for preventing retransmission of dropped data packets from a mobile station, in accordance with the present disclosure.

DETAILED DESCRIPTION

In order to overcome the drawbacks discussed hitherto, the present disclosure envisages a method for preventing/circumventing retransmission of lost/dropped data packets from mobile stations.

Referring to FIG. 2, there is shown a system 200 for preventing circumventing retransmission of lost/dropped data packets from a source mobile station, preferably source mobile station. The system 200 incorporates a source mobile station 20, a destination mobile station 22, a source eNodeB 24 and a second eNodeB 26. The source mobile station 20 and the source eNodeB 24 are communicably coupled via a first wireless communication channel 28A. The source eNodeB 24 is communicably coupled to the destination eNodeB 26 via a wired communication channel 28B. Further, the destination eNodeB 26 is communicably coupled to the destination mobile station 22 via a second wireless communication channel 28. The communicable coupling between the source mobile station 20 and destination mobile station 22 via the source eNodeB 24 and the destination eNodeB 26 forms network communication architecture.

In accordance with the present disclosure, when data transfer occurs between the source mobile station 20 and destination mobile station 22, both the source mobile station 20 and destination mobile station 22 would be implementing a common TCP session. Subsequently, the source eNodeB 24 and the destination eNodeB 26 communicably coupled to the source mobile station 20 and the destination mobile station 22 would also be implementing the common TCP session. Typically, the TCP session would be the common factor for the source mobile station 20, destination mobile station 22, source eNodeB 24 and destination eNodeB 26.

In accordance with the present disclosure, the end points of the (common) endpoints are distributed between the (source and destination) mobile stations 20 and 22, and (source and destination) eNodeBs 24 and 26. Preferably, the source-side TCP endpoint is distributed between the source mobile station 20 and first eNodeB 24, and the destination-side TCP endpoint is distributed between the destination mobile station 22 and second eNodeB 26.

In accordance with the present disclosure, in a typical data transfer operation between the source mobile station 20 and destination mobile station 22, when data (preferably in the form of TCP segment) is transmitted from the source mobile station 20 to the destination mobile station 22, the data packets (of the TCP segment) are routed to the source eNodeB 24 communicably coupled to the source mobile station 20 via the wireless communication channel 28A. Preferably, the source eNodeB 24 buffers the received data packets. Subsequently, the source eNodeB 24 routes the data packets to the destination eNodeB 26 which subsequently routes the data packets to the destination mobile station 22. When the data packets are successfully routed from the source mobile station 20 to the source eNodeB 24, the source eNodeB is instructed (triggered) to handle retransmission of any of the received data packets instead of the source mobile station 20, thereby preventing needless/unnecessary utilization of wireless communication channel 28A.

In accordance with the present disclosure, when the data packets are routed from the first eNodeB 24 to the second eNodeB 26 via the wired communication channel 28B, if any of the data packets are lost/dropped due to a congestion in the wired communication channel 28B and fail to reach the destination mobile station 22 thereby resulting in a packet communication failure, the destination mobile station 22 generates a No-Acknowledgement (NACK) message, and transmits the NACK message back towards the source mobile station 20 (the path from the destination mobile station 22 to the source mobile station 20 traverses through the destination eNodeB 26 and source eNodeB 24).

In accordance with the present disclosure, the NACK messages corresponding to any lost/dropped data packets are transmitted from the destination mobile station 22 to the destination eNodeB 26 via the wireless communication channel 28C and subsequently, the destination eNodeB 26 transmits the NACK messages back to the first eNodeB 24 via the wired communication channel 28B.

In accordance with the present disclosure, the first eNodeB 20 is configured to intercept and subsequently analyze the NACK messages transmitted from the destination mobile station 22 and intended for the source mobile station 20. The first eNodeB 20 interprets/analyzes the NACK messages sent from the destination mobile station 22, and accordingly retransmits the corresponding data packets to the destination eNodeB 26 via the wired communication channel 28B. Subsequently, the destination eNodeB 26 routes the (retransmitted) data packets to the destination mobile station 22. By intercepting the NACK messages meant for the source mobile station 20 and by retransmitting the data packets corresponding to the NACK messages (the data packets to be retransmitted are selected from the pool of data packets previously buffered by the first eNodeB 24), the source eNodeB 24 prevents the source mobile station 20 from retransmitting the lost/dropped data packets, thereby also ensuring that wireless communication channel 28A is not repetitively utilized for retransmission of lost/dropped data packets, and also ensuring that the NACK message is not transmitted via the wireless communication channel 28A to the source mobile station 20.

In accordance with the present disclosure, if the NACK messages transmitted from the destination mobile station 22 are interpreted by the destination eNodeB 26 instead of the source eNodeB 24, the destination eNodeB interprets/analyzes the NACK messages, and subsequently retransmits the lost/dropped data packets to the destination mobile station 22. In this scenario, the data packets to be retransmitted to the destination mobile station 22 are selected (by second eNodeB 26) from the pool of data packets previously buffered by the second eNodeB 26. In this manner the destination eNodeB 26 prevents the source mobile station 20 from retransmitting the lost/dropped data packets, thereby also ensuring that wireless communication channel 28A is not repetitively utilized for retransmission of lost/dropped data packets, and also ensuring that NACK messages are not transmitted via the wireless communication channel 28A to the source mobile station 20. By ensuring that the wireless communication channel 28A is not repetitively utilized for either retransmitting dropped data packets or for transmitting NACK messages back to the source mobile station 20, the system 200 envisaged by the present disclosure provides for increased availability of the wireless communication channel 28A for any subsequent data transmission operations. Further, the system 200 envisaged by the present disclosure also ensures that the source mobile station 20 is absolved from managing NACK messages and from retransmitting the dropped data packets.

Referring to FIG. 3, there is shown a flow chart illustrating the steps involved in the method for preventing retransmission of dropped data packets from mobile stations. The method, in accordance with the present disclosure envisages distributing a source endpoint (also referred to as 'first endpoint') of a TCP session, between a source mobile station and a source network element (step 300). At step 302, a destination endpoint (second endpoint) of the TCP session is distributed between a destination mobile station and a destination network element. In accordance with the present disclosure, the source network element and destination elements are eNodeBs. At step 304, data packets are transmitted from the source mobile station to the destination mobile station via the source eNodeB and destination eNodeB respectively. At step 306, the source eNodeB is configured to intercept Negative Acknowledgement (NACK) messages which are transmitted from the destination mobile station and intended for the source mobile station. The source eNodeB is further configured to identify and retransmit data packets corresponding to the NACK messages, to the destination mobile station. At step 308, the destination eNodeB is configured to selectively intercept the Negative Acknowledgement (NACK) messages transmitted from the destination mobile station and intended for the source mobile station. Subsequently, the destination eNodeB is configured to retransmit data packets corresponding to the NACK messages, to the destination mobile station only in the event that the dropped data packets have been received and buffered by the destination eNodeB. At step 310, the Transmission Control Protocol (TCP) session corresponding to the source mobile station is prevented from being utilized for retransmission of the dropped data packets.

TECHNICAL ADVANTAGES

The technical advantages of the present disclosure include the realization of a system and method that enables distributed TCP sessions. The system and method further prevent needless utilization of wireless communication channels. The system and method envisaged by the present disclosure also prevent retransmission of lost/dropped data packets through a wireless communication channel, and instead provides for the retransmission through a wired communication channel. The system and method also provides for improved utilization of wireless communication channels. The system and method also provides for efficient management of wireless communication resources.

The foregoing description of the specific embodiments will so fully reveal the general nature of the embodiments herein that others can, by applying current knowledge, readily modify and or adapt for various applications such embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, those skilled in the art will recognize that the embodiments herein can be practiced with modifications.

What is claimed is:

1. A method for preventing retransmission of dropped data packets from a mobile station, said method comprising the following steps:

distributing a first end point of a TCP session between a source mobile station and a source network element;

distributing a second end point of the TCP session between a destination mobile station and a destination network element;

initiating transmission of a plurality of data packets from the source mobile station to the destination mobile station via the source network element and destination network element;

configuring the source network element to intercept Negative Acknowledgement (NACK) messages corresponding to the dropped data packets, transmitted from the destination mobile station and intended for the source mobile station, and further configuring the source network element to identify and retransmit data packets corresponding to the NACK messages, to the destination mobile station;

configuring the destination network element to selectively intercept the Negative Acknowledgement (NACK) messages transmitted from the destination mobile station and intended for the source mobile station, and further configuring the destination network element to retransmit data packets corresponding to the NACK messages, to the destination mobile station only in the event that said data packets have been received and buffered by the destination network element; and preventing the first endpoint of the TCP session corresponding to the source mobile station from being utilized for retransmission of the dropped data packets.

2. The method as claimed in claim 1, wherein the step of configuring the source network element to identify and retransmit data packets to the destination mobile station, further includes the step of preventing the source mobile station from retransmitting the data packets in response to the NACK messages transmitted from the destination mobile station.

3. A system for preventing retransmission of dropped data packets from a mobile station, said system comprising a source mobile station, a source network element, a destination mobile station and a destination network element, wherein:

the source network element is configured to intercept Negative Acknowledgement messages (NACK) transmitted from the destination mobile station and intended for the source mobile station, the source network element further configured to identify and retransmit data packets corresponding to the NACK messages, to the destination mobile station;

the destination network element is configured to selectively intercept the Negative Acknowledgement (NACK) messages transmitted from the destination mobile station and intended for the source mobile station, said destination network element further configured to retransmit data packets corresponding to the NACK messages, to the destination mobile station only in the event that said data packets have been received and buffered by the destination network element, and wherein the source network element and destination network element are configured to prevent the source mobile station and destination mobile station from retransmitting data packets corresponding to said NACK messages, thereby preventing utilization of first endpoint of the TCP session corresponding to the source mobile station for retransmission of the data packets.

4. The system as claimed in claimed in claim 3, wherein the source network element and the destination network element are eNodeBs.

5. The system as claimed in claim 3, wherein the source mobile station and the source network element share a first end point of the TCP session.

6. The system as claimed in claim 3, wherein the destination mobile station and the destination network element share a second end point of the TCP session.

7. The system as claimed in claim 3, wherein the source mobile station and source network element are communicably coupled through a first wireless communication channel and wherein the destination mobile station and destination network element are communicably coupled through a second wireless communication channel, and wherein the source network element and destination network element are communicably coupled through a wired communication channel.

* * * * *